United States Patent Office 2,827,453
Patented Mar. 18, 1958

2,827,453

3-PHTHALIMIDO PENTOSIDES AND DERIVATIVES

Bernard Randall Baker, Nanuet, Joseph Peter Joseph, Cliffside Park, and Robert Eugene Schaub, Paramus, N. J., assignors to American Cyanamid Company, New York, N. Y., a corporation of Maine No Drawing. Application January 26, 1955
Serial No. 484,298

7 Claims. (Cl. 260—210)

This invention relates to a new series of organic compounds. More particularly, this invention is concerned with 1 - halo - 2,5 - disubstituted - 3 - phthalimido - D-furanoses, intermediates therefor, and methods for their preparation.

In our copending U. S. patent application Serial No. 405,236, filed January 20, 1954, we disclose a method for preparing a series of aminoglycosidopurines, which are useful in the treatment of trypanosomiasis. These compounds, of which 6-dimethylamino-9-(3'-amino-β-D-ribofuranosyl)purine is a specific example, may be prepared by condensing a chloromercuripurine with a completely acylated haloamino sugar, then deacylating the resultant product to obtain the desired aminoglycosidopurine. For example, 1-acetyl-2,5-dibenzoyl-3-acetamino-D-ribofuranose may be converted to 2,5-dibenzoyl-3-acetamino - D - ribofuranosyl chloride - titanium chloride complex by treatment with titanium tetrachloride in chloroform. The resulting compound is then condensed with the chloromercury salt of 2-methylmercapto-6-dimethylaminopurine to form the desired aminoglycosidopurine.

The above-described method is satisfactory for the synthesis of aminoglycosidopurines when the chloromercury salt of 2-methyl-mercapto-6-dimethylaminopurine is employed as the intermediate purine. With the corresponding salt of 6-benzamidopurine, however, undesirable anomerization, isomerization, and decomposition products, such as the α-isomer, are also produced. In addition, when the corresponding acylated halo arabinofuranose (e. g., 1-acetyl-2,5-dibenzoyl-3-acetamino-D-arabinofuranose) is treated with titanium, tetrachloride, condensed with 2-methylmercapto-6-dimethyl-aminopurine, desulfurized, and debenzoylated, the expected 6-dimethylamino - 9 - (3' - acetamino - 3 - deoxy - α - D-arabinofuranosyl)purine is obtained, but the corresponding α-isomer of the ribofuranosyl sugar is also formed as an undesirable reaction product. An additional difficulty in the aforementioned method is that when 5,6-dimethylbenzimidazole is substituted for the purine moiety, the reaction fails completely due to the instability of the benzimidazole nucleus to the titanium tetrachloride. Still another objection to the N-acetyl-blocking group is that it can be base-hydrolyzed to the free amine only when the acetamino group is adjacent to a cis-hydroxyl.

The above-mentioned difficulties with the 3-acetamino-furanoses cannot be overcome by avoiding formation of the titanium tetrachloride complex with known methods. For example, chlorination of the acylated amino sugar by conventional means, such as hydrogen chloride in ether, is inoperative due to the weakly basic property of the acetamino group, which causes precipitation of a hydrochloride salt and stops the reaction.

We have now discovered that the 1-chloro-2,5-disubstituted-3-phthalimido-arabinofuranoses and corresponding ribofuranoses are useful intermediates in the synthesis of aminoglycosidopurines. They possess considerable advantages in that they overcome all of the above-mentioned difficulties encountered with the corresponding 3-acetaminofuranosides. By employing the N-phthalyl blocking group, the resultant non-basic phthalimido group permits the preparation of chloro sugars, such as 2,5-dibenzoyl-3-phthalimido-D-ribofuranosyl chloride without the necessity for resorting to the use of titanium tetrachloride. Moreover, the N-phthalimido blocking group can be selectively removed by hydrazine to form the aminoglycosidopurine whether the adjacent hydroxyl is in cis or trans relationship to the phthalimido radical.

The compounds of the present invention may be represented by the following general formula:

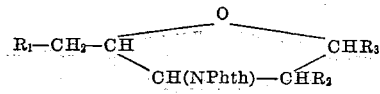

wherein $R_1$ and $R_2$ are, interchangeably, members selected from the group consisting of hydroxy, benzoyloxy, and acetoxy radicals, $R_3$ is a member selected from the group consisting of methoxy, hydroxy, acetoxy, and chloro radicals and Phth denotes the phthalyl radical. Inasmuch as the compounds depicted by the above general formula may exist in either the α or β configuration, both of which may be prepared by the methods disclosed herein, it is intended that these configurational forms be included within the scope of this invention.

The final products of the present invention—namely, 1 - chloro - 2,5 - dibenzoyl - 3 - phthalimido - D - arabinofuranose; 1 - chloro - 2,5 - dibenzoyl - 3 - phthalimido-D - ribofuranose; 1 - chloro - 2,5 - diacetyl - 3 - phthalimido - D - ribofuranose and 1 - chloro - 2,5 - diacetyl-3-phthalimido-D-arabinofuranose find utility as intermediates in the preparation of synthetic medicinal compounds. They can be employed in the synthesis of aminoglycosidopurines such as those disclosed in the copending U. S. application of Bernard R. Baker, Joseph P. Joseph and Robert E. Schaub, Serial No. 405,236, filed January 20, 1954. These compounds are known to be effective in the treatment of trypanosomiasis.

As an example of the utility ascribed to the compounds of the present invention, it may be stated that the 1-chloro-2,5-disubstituted-3-phthalimidofuranosides, when treated with the chloromercury salt of 6-dimethylaminopurine yield the corresponding 6-dimethylamino-9-(2',5'-disubstituted-3-phthalimido-furanosyl) purines which may be deacylated to 6-dimethylamino-9-(3'-phthalimidofuranosyl)purines upon treatment with methyl alcohol and sodium methoxide followed by refluxing with dimethylformamide and acetic acid. Treatment of these compounds with hydrazine removes the phthalimido group to yield the active 6-dimethylamino-9-(3'-aminofuranosyl)-purine. More specifically, a 1-chloro-2,5-dibenzoyl-3-phthalimido-D-ribofuranose, when treated with the chloromercury salt of 6-dimethylamino purine, yields 6-dimethylamino - 9 - (2',5' - dibenzoyl - 3' - phthalimido-β-D-ribofuranosyl)purine. Debenzoylation and hydrazinolysis results in 6-dimethylamino-9-(3'-amino-β-D-ribofuranosyl)purine, an active trypanosomicidal agent.

As will be readily determined from the above, the present invention involves a series of chemical transformations resulting in the formation of new and hitherto unknown chemical compounds. It is intended, therefore, that both the intermediate compounds and the final products, together with the process causing their formation be included within the scope of the present invention.

In accordance with one embodiment of our process, methyl N-isopropylidene-3-amino-α-D-arabinofuranoside is converted to methyl 3-phthalimido-α-D-arabinofuranoside upon contact with phthalic anhydride in the presence of an organic solvent such as dioxane, acetamide, ethoxyethanol or diethylformamide. Use of an organic solvent can be avoided, if so desired, by fusion of the starting materials. Benzoylation of the 2'- and 5'-positions is effected by treatment with benzoyl chloride. The methoxy group in the 1-position is then converted to the hydroxy upon treatment with a hydrohalide such as hydrogen bromide in the presence of an alkylene halide such as methylene chloride or ethylene chloride and a lower fatty acids as for example, acetic, propionic, butyric or valeric. The halo sugar is preferably converted to the hydroxy form (furanose) by treatment with an oxide of a noble metal such as silver oxide or mercuric oxide. However, the conversion also takes place in the presence of a base as for example, an alkali metal carbonate, bicarbonate or hydroxide; or, alternatively, in the presence of water only. The use of an acid acceptor is preferred because it circumvents the side effects of the halogen acid and increases the rate of the reaction. Acylation of the furanose in the 1-position with a suitable acylating agent, such as acetic or propionic anhydride, followed by treatment with a hydrohalic acid yields the desired 1-halo-2,5-dibenzoyl-3-phthalimido-D-arabinofuranose. Suitable hydrohalides are hydrochloric and hydrobromic acids. If desired, the acylation step may be omitted by direct halogenation of 2,5-dibenzoyl-3-phthalimido-D-arabinofuranose.

To prepare the compounds of this series with the "ribo" configuration on the sugar, one hydrolyzes methyl 3-acetamino-β-D-ribofuranoside to obtain methyl 3-amino-β-D-ribofuranoside. This compound, upon treatment with phthalic anhydride, yields methyl 3-phthalimido-β-D-ribofuranoside. As above, acylation of the hydroxyl group in the 2- and 5-positions yields the corresponding furanoside which upon contact with a hydrohalide and a lower fatty acid, followed by hydrolysis yields the corresponding furanose. Treatment with acetic anhydride yields the 1-acetyl derivative. This compound, when reacted with a hydrohalic acid may be converted to the corresponding 1-halo-2,5-disubstituted-3-phthalimido-D-ribofuranose. Alternatively, as with the corresponding arabinofuranose, treatment with acetic anhydride may be omitted, conversion of the 2,5-dibenzoyl-3-phthalimido-3-ribofuranose to the corresponding chloro derivative being suitably effected by direct chlorination with hydrogen chloride.

The following examples are given to illustrate, but not to limit the scope of the present invention.

Example 1

A solution of 203 parts by weight of methyl N-isopropylidene-3-amino-α-D-arabinofuranoside and 163 parts by weight of phthalic anhydride in 5 parts by volume of dimethylformamide was refluxed for 45 minutes. After the addition of 5 parts by volume of water, the solution was evaporated to dryness under reduced pressure. The residue was dissolved in ethanol. The solution was clarified with activated charcoal and diatomaceous earth, then evaporated to dryness in vacuo. Crystallization from chloroform gave white crystals of methyl 3-phthalimido-α-D-arabinofuranoside. This compound is soluble in ethanol, acetic acid and dimethylformamide, but insoluble in benzene or petroleum ether.

Example 2

A solution of 16 parts by weight of methyl N-isopropylidene-3-amino-α-D-arabinofuranoside and 13 parts by weight of phthalic anhydride in 160 parts by volume of dimethylformamide was refluxed for 90 minutes. The solution, clarified with activated charcoal, was evaporated to dryness under reduced pressure. Crystallization from methylene chloride gave a 75% yield of methyl 3-phthalimido-α-D-arabinofuranoside.

Example 3

To a solution of 0.436 part by weight of methyl 3-phthalimide-α-D-arabinofuranoside in 5 parts by volume of pyridine was added 0.44 part by volume of benzoyl chloride at 3° C. After 6 days at 3° C., the mixture was diluted with 25 parts by volume of ice water and extracted with three 5 parts by volume portions of methylene chloride. The combined extracts, washed with excess aqueous sodium bicarbonate, then water, were dried with magnesium sulfate and evaporated to dryness under reduced pressure. The residue was twice dissolved in 5 parts by volume portions of toluene and evaporated to dryness under reduced pressure. The residue of methyl 2,5-dibenzoly-3-phthalimido-α-D-arabinofuranoside was an orange glass. This compound is soluble in alcohol and chloroform, but insoluble in water or petroleum ether.

Example 4

To a solution of 1.3 parts by weight of methyl 2,5-dibenzoyl-3-phthalimido-α-D-arabinofuranoside in 3 parts by volume of methylene chloride was added 6.5 parts by volume of 30% hydrogen bromide in acetic acid. After 30 minutes, the solution was diluted with 4 parts by volume of methylene chloride and 20 parts by volume of water. The separated organic layer was washed with excess aqueous sodium bicarbonate, then water. The still wet methylene dichloride solution was added to a stirred mixture of 1.3 parts by weight of silver carbonate, 10 parts by volume of acetone and 0.1 part by volume of water. After 30 minutes, the mixture was filtered through activated charcoal. Evaporation of the filtrate to dryness under reduced pressure left a 50% yield of 2,5-dibenzoyl-3-phthalimido-D-arabinofuranose as a white glass which gave a positive Benedict's test and contained no methoxyl. This compound is soluble in alcohol, acetone or chloroform, but insoluble in water or petroleum ether.

Example 5

A solution of 0.50 part by weight of 2,5-dibenzoyl-3-phthalimido-D-arabinofuranose in 2.5 parts by volume of pyridine and 2.5 parts by volume of acetic anhydride was heated on a steam-bath for one hour. The solution was poured into 25 parts by volume of ice water and extracted with five 5 parts by volume portions of methylene chloride. The combined extracts were washed with excess aqueous sodium bicarbonate, then water. Dried with magnesium sulfate, the organic solution was evaporated to dryness under reduced pressure. The residue was several times dissolved in toluene and the solution evaporated to dryness under reduced pressure, leaving 1-acetyl-2,5-dibenzoyl-3-phthalimido-D-arabinofuranoside as a glass. This compound is soluble in alcohol, acetone or chloroform, but insoluble in water or petroleum ether.

Example 6

A solution of 3.5 parts by weight of 1-acetyl-2,5-dibenzoyl-3-phthalimido-D-arabinofuranoside in 350 parts by volume of dry ether saturated with hydrogen chloride was allowed to stand at −3° C. for 6 days in a closed container. The solution was evaporated to dryness under reduced pressure (bath 25° C.). The residue was twice dissolved in 20 parts by volume of dry benzene and evaporated to dryness under reduced pressure leaving 1-chloro-2,5-dibenzoyl-3-phthalimido-D-arabinofuranose as a glass. This compound is soluble in chloroform, ether or benzene, but insoluble in water or petroleum ether.

Example 7

A solution of 17 parts by weight by 2,5-dibenzoyl-3-phthalimido-D-arabinofuranose in 500 parts by volume of dry ether saturated with hydrogen chloride and 17 parts by volume of acetyl chloride was allowed to stand in a closed container for 5 days at −5° C. The solution was evaporated and treated with dry benzene as in Example 6, to give 1-chloro-2,5-dibenzoyl-3-phthalimido-D-arabinofuranose.

Example 8

A solution of 1.00 part by weight of 6-dimethylamino-9-(3'-amino-β-D-ribofuranosyl)purine and 0.55 part by weight of phthalic anhydride in 7.2 parts by volume of pyridine was heated at 90° C. to 95° C. for 15 minutes.

Then, 7.2 parts by volume of acetic anhydride was added and the solution was heated on a steam-bath for 1 hour more. The solution was poured into 70 parts by volume of ice water. The white crystals of 6-dimethylamino-9-(2',5'-diacetyl-3'-phthalimido)-β-D-ribofuranosyl purine were collected.

*Example 9*

A solution of 1.00 part by weight of 2,5-diacetyl-3-phthalimido-D-ribofuranose in 5 parts by volume of pyridine and 5 parts by volume of acetic anhydride was heated on a steam-bath for 75 minutes. The solution was poured into 5 parts by volume of ice water and extracted with three 20 parts by volume portions of methylene chloride. The combined extracts, washed with excess aqueous sodium bicarbonate, then water, were dried with magnesium sulfate and evaporated to dryness under reduced pressure. Recrystallization of the residue from ethyl acetate-heptane gave a 76% yield of 1,2,5-triacetyl-3-phthalimido-D-ribofuranose as white crystals. These were further recrystallized from absolute alcohol. The compound is insoluble in water or cold alcohol, but is soluble in chloroform, acetone or hot alcohol.

*Example 10*

To a solution of 1.00 part by weight of methyl 3-phthalimido-α-D-arabinofuranoside in 18 parts by volume of pyridine cooled to 5° C. was added 1.0 part by volume of methanesulfonyl chloride. After 18 hours at about 25° C., protected from moisture, the mixture was poured into 90 parts by volume of ice water. The crystals of methyl 2,5-dimesyl-3-phthalimido-α-D-arabinofuranoside were collected and washed with water. Recrystallization from ethanol gave white crystals. This compound is soluble in pyridine, hot alcohol or chloroform, but insoluble in water, heptane or cold alcohol.

*Example 11*

A mixture of 0.500 part by weight of methyl 2,5-dimesyl-3-phthalimido-α-D-arabinofuranoside, 0.46 part by weight of anhydrous sodium acetate and 4.8 parts by volume of β-ethoxyethanol containing 5% water was refluxed for 24 hours. The cooled reaction mixture was filtered from sodium mesylate and evaporated to dryness under reduced pressure. The residue was heated with 2.5 parts by volume of pyridine and 2.5 parts by volume of acetic anhydride in a steam-bath for 1 hour, filtered, and the filtrate evaporated to dryness under reduced pressure. After the addition of water, the mixture was extracted chloroform. The chloroform solution, washed with aqueous sodium bicarbonate and water, was dried with magnesium sulfate, then evaporated to dryness under reduced pressure leaving 0.3 part by weight of methyl 2,5-diacetyl-3-phthalimido-α-D-ribofuranoside as a glass. This compound is soluble in acetone or chloroform, but insoluble in water or heptane.

*Example 12*

A solution of 0.215 part by weight of methyl 2,5-diacetyl-3-phthalimido-α-D-ribofuranoside in 0.7 part by volume of methylene chloride and 1.49 parts by volume of 30% hydrogen bromide in acetic acid was allowed to stand for 1 hour at room temperature. The solution was diluted with 5 parts by volume of ice water and extracted with three 2 parts by volume portions of methylene chloride. The combined extracts were washed with excess aqueous sodium bicarbonate and ice water. The organic solution was diluted with 2.2 parts by volume of acetone and 0.022 part by volume of water. After the addition of 0.22 part by weight of silver carbonate, the mixture was stirred for ½ hour, filtered through a layer of activated charcoal and evaporated to dryness under reduced pressure leaving 2,5-diacetyl-3-phthalimido-D-ribofuranose as a glass. This compound is soluble in acetone or methylene chloride, but insoluble in water or heptane.

*Example 13*

A solution of 0.128 part by weight of 2,5-diacetyl-3-phthalimido-D-ribofuranose in 0.64 part by volume of pyridine and 0.64 part by volume of acetic anhydride was heated on a steam-bath for one hour, then diluted with 6 parts by volume of water and extracted with chloroform. The combined chloroform extracts, washed with excess aqueous sodium bicarbonate, then water, were dried with magnesium sulfate and evaporated to dryness under reduced pressure. Crystallization from alcohol gave white crystals of 1,2,5-triacetyl-3-phthalimido-D-ribofuranose, M. P. 135° C. to 137° C. This compound is soluble in acetone, chloroform or pyridine, but insoluble in water or cold alcohol.

*Example 14*

A solution of 1 part by weight of 2,5-diacetyl-3-phthalimido-D-ribofuranose in 5 parts by volume of pyridine and 5 parts by volume of acetic anhydride was heated on a steam-bath for 75 minutes, then poured into 50 parts by volume of ice water and extracted with three 20 parts by volume portions of methylene chloride. The combined extracts, washed with excess aqueous sodium bicarbonate and water, then dried with magnesium sulfate, were evaporated to dryness under reduced pressure. The residue was dissolved in toluene and the evaporation repeated. Recrystallization from ethyl acetate-heptane gave a 76% yield of 1,2,5-triacetyl-3-phthalimido-D-ribofuranose, M. P. 136° C. to 140° C. Recrystallization from alcohol afforded white crystals, M. P. 140° C. to 142° C.

*Example 15*

A solution of 2.4 parts by weight of 1,2,5-triacetyl-3-phthalimido-D-ribofuranose in 2.4 parts by volume of acetyl chloride and 50 parts by volume of dry ether saturated with hydrogen chloride at 0° C. was allowed to stand at —5° C. protected from moisture for 3 days. The solution was evaporated to a syrup under reduced pressure. The residue was then re-evaporated with dry benzene leaving 2.4 parts by weight of 1-chloro-2,5-diacetyl-3-phthalimido-D-ribofuranoside as a glass. This compound is soluble in chloroform or ether, but insoluble in heptane. It is insoluble in water, but decomposes on contact therewith.

*Example 16*

A solution of 0.70 part by weight of methyl 2,5-diacetyl-3-phthalimido-α-D-ribofuranoside in 7 parts by volume of methanol and 2 parts by volume of 1 N methanolic sodium methoxide was refluxed for ½ hour, then evaporated to dryness under reduced pressure. The residue was refluxed with 3 parts by volume of dimethylformamide and 0.24 part by volume of acetic acid for ¾ hour, then evaporated to dryness under reduced pressure. The residue was shaken with water and chloroform. The chloroform solution was evaporated to dryness under reduced pressure leaving methyl 3-phthalimido-α-D-ribofuranoside as a glass. This compound is soluble in chloroform or alcohol, but insoluble in water or benzene.

*Example 17*

To a solution of 0.43 part by weight of methyl 3-phthalimido-α-D-ribofuranoside in 5 parts by volume of pyridine cooled to 5° C. was added 0.44 part by volume of benzoyl chloride. After 4 days at 3° C. to 5° C. protected from moisture, the mixture was poured into 25 parts by volume of ice water and extracted with methylene chloride. The organic solution was washed with excess aqueous sodium bicarbonate and water, then dried with magnesium sulfate and clarified with activated charcoal. Evaporation to dryness under reduced pressure left a glass. The residue was dissolved in toluene and the evaporation repeated leaving a 76% yield of methyl 2,5-dibenzoyl-3-phthalimido-α-D-ribofuranoside as a glass. This compound is insoluble in water or petroleum ether, but soluble in acetone or chloroform.

Example 18

A solution of 0.300 part by weight of methyl 2,5-dibenzoyl-3-phthalimido-α-D-ribofuranoside in 0.9 part by volume of methylene chloride and 1.5 parts by volume of 30% hydrogen bromide in acetic acid was heated as in Example 12 to give 2,5-dibenzoyl-3-phthalimido-D-ribofuranose. This compound is soluble in chloroform, acetone or alcohol, but insoluble in water or pentane.

Example 19

A solution of 1.90 parts by weight of 2,5-dibenzoyl-3-phthalimido-D-ribofuranose in 9.5 parts by volume of pyridine and 9.5 parts by volume of acetic anhydride was heated as in Example 13 to give, on recrystallization from alcohol, 1-acetyl-2,5-dibenzoyl-3-phthalimido-D-ribofuranose, M. P. 136° C. to 138° C. Recrystallization of a sample from absolute alcohol gave white crystals, M. P. 138° C. to 140° C.

Example 20

A solution of 0.220 part by weight of methyl 2,5-dibenzoyl-3-phthalimido-α-D-ribofuranoside in 1.55 parts by volume of acetic acid and 0.17 part by volume of acetic anhydride containing 0.094 part by volume of 96% sulfuric acid was allowed to stand for 18 hours. Processing according to Example 19 gave white crystals of 1-acetyl-2,5-dibenzoyl-3-phthalimido-D-ribofuranose, M. P. 134° C. to 136° C.

Example 21

A solution of 2.75 parts by weight of 1-acetyl-2,5-dibenzoyl-3-phthalimido-D-ribofuranoside in 2.8 parts by volume of acetyl chloride and 60 parts by volume of dry ether saturated with hydrogen chloride at 5° C. was allowed to stand at −5° C. for 3 days protected from moisture. During this time, crystals of the product separated. Solvent was removed under reduced pressure. The residue was dissolved in benzene and the evaporation repeated leaving 2.58 parts by weight of white crystals of 1-chloro-2,5-dibenzoyl-3-phthalimido-D-ribofuranoside, M. P. 160° C. to 162° C. (dec.). This compound is soluble in acetone or chloroform, but insoluble in ether or heptane. The compound is decomposed by contact with water or alcohols.

Example 22

A solution of 0.98 part by weight of methyl 2,5-diacetyl-3-acetamino-β-D-ribofuranoside (J. Am. Chem. Soc. 76, 4044 (1954)) in 13 parts by volume of methanol and 0.90 part by volume of 1 N methanolic sodium methoxide was refluxed for 30 minutes, then evaporated to dryness under reduced pressure. The residual methyl 3-acetamino-β-D-ribofuranoside was dissolved in 53 parts by volume of 0.5 N barium hydroxide and heated at 100° C. for 18 hours. The solution was neutralized with solid carbon dioxide, filtered through diatomaceous earth and evaporated to dryness under reduced pressure, leaving 0.61 part by weight of methyl 3-amino-β-D-ribofuranoside as a low-melting solid. This was dissolved in 10 parts by volume of dimethylformamide, 0.55 part by weight of phthalic anhydride was added and the solution was refluxed for about 45 minutes. The solution was concentrated to a small volume under reduced pressure, then diluted with 15 parts by volume of water. The crystals of methyl 3-phthalimido-β-D-ribofuranoside were collected and washed with water, M. P. 174° C. to 176° C. Recrystallization from ethyl acetate gave nearly white crystals, M. P. 184° C. to 187° C. This compound is soluble in alcohol or hot ethyl acetate, but insoluble in water or benzene.

Example 23

To a solution of 0.150 part by weight of methyl 3-phthalimido-β-D-ribofuranoside in 2 parts by volume of dry pyridine was added 0.15 part by volume of benzoyl chloride. The solution was heated at 100° C. for about 2½ hours, protected from moisture, then poured into 10 parts by volume of water. The mixture was extracted with chloroform, washed with aqueous sodium bicarbonate and dried with magnesium sulfate, the chloroform solution was evaporated to dryness under reduced pressure, leaving methyl 2,5-dibenzoyl-3-phthalimido-β-D-ribofuranoside as a gum contaminated with benzoic anhydride. This compound is soluble in chloroform or acetone, but insoluble in water or hexane.

Example 24

To a solution of 0.310 part by weight of methyl 2,5-dibenzoyl-3-phthalimido-β-D-ribofuranoside in 2.3 parts by volume of acetic acid and 0.25 part by volume of acetic anhydride was added 0.082 part by volume of 96% sulfuric acid. The solution was allowed to stand at room temperature in a sealed container for about 18 hours, then diluted with 25 parts by volume of water and extracted with chloroform. The extract, washed with excess aqueous sodium bicarbonate and dried with magnesium sulfate, was evaporated to dryness under reduced pressure. Crystallization of the residue from 3 parts by volume of methanol gave 1-acetyl-2,5-dibenzoyl-3-phthalimido-α-D-ribofuranose as white crystals, M. P. 137° C. to 139° C. This compound is soluble in chloroform or acetone, but insoluble in water or cold alcohol.

Example 25

By hydrolysis of 1.99 parts by weight of methyl 2,5-diacetyl-3-acetamino-α-D-ribofuranoside as described in Example 22 was obtained 1.07 parts by weight of methyl 3-amino-α-D-ribofuranoside as a gum. This was dissolved in 20 parts by volume of dimethylformamide, 1.08 parts by weight of phthalic anhydride was added and the solution was refluxed for 45 minutes. The solution was evaporated to a thick syrup under reduced pressure. Addition of water gave a turbid solution which was extracted with three 10 parts by volume portions of chloroform. The combined extracts, dried with magnesium sulfate, were evaporated to dryness under reduced pressure, leaving methyl 3-phthalimido-α-D-ribofuranoside as a syrup. This compound is soluble in water or chloroform, but insoluble in heptane.

Example 26

Benzoylation of 0.5 part by weight of methyl 3-phthalimido-α-D-ribofuranoside as described in Example 23 gave methyl 2,5-dibenzoyl-3-phthalimido-α-D-ribofuranoside as a glass. This compound is soluble in acetone or chloroform, but insoluble in water or pentane.

Example 27

Acetolysis of 0.750 part by weight of methyl 2,5-dibenzoyl-3-phthalimido-α-D-ribofuranoside as described in Example 24 gave 1-acetyl-2,5-dibenzoyl-3-phthalimido-α-D-ribofuranose as white crystals, M. P. 137° C. to 139° C.

We claim:

1. Compounds having the general formula:

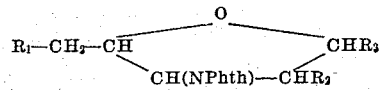

wherein $R_1$ and $R_2$ are, interchangeably, members selected from the group consisting of hydroxy, benzoyloxy, and acetoxy radicals, $R_3$ is a member selected from the group consisting of methoxy, hydroxy, acetoxy, and chloro radicals and Phth denotes the phthalyl radical.

2. The 1-chloro-2,5-mononuclear-aroyl-3-phthalimido-D-arabinofuranoses.

3. The 1-chloro-2,5-di-lower-alkanoyl-3-phthalimido-D-arabinofuranoses.

4. 1-chloro-2,5-dibenzoyl-3-phthalimido-D-arabinofuranose.

5. 2,5-dibenzoyl-3-phthalimido-D-ribofuranose.
6. 1 - chloro - 2,5 - dibenzoyl-3-phthalimido-D-ribofuranose.
7. A method for preparing compounds having the general formula:

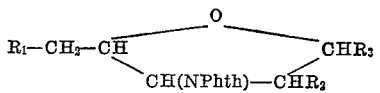

wherein $R_1$ and $R_2$ are, interchangeably, members selected from the group consisting of hydroxy, benzoyloxy and acetoxy radicals, and $R_3$ is a chloro radical; which comprises the steps of treating a methyl N-isopropylidene-3-amino-pentofuranoside with phthalic anhydride to obtain a methyl 3-phthalimido-pentofuranoside, acylating said compound to obtain:

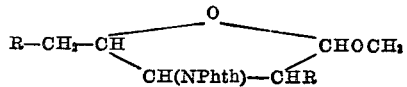

wherein R is a member selected from the group consisting of benzoyloxy and acetoxy radicals, converting said compound to the corresponding furanose to obtain:

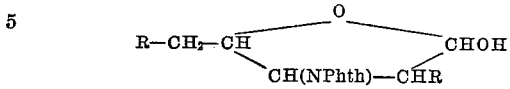

wherein R is assigned the values given above, and then converting said compound to the corresponding 1-chloro sugar.

References Cited in the file of this patent

Pigman et al.: Carbohydrate Chemistry, copyright 1948, pp. 150, 151, 159, 160, 165–167.
Sheehan et al.: J. Am. Chem. Soc., 71 (1949), pp. 1856–61.
Waller et al.: J. Am. Chem. Soc., 75 (1953), p. 2025.
Hewitt et al.: Antibiotics and Chemotherapy, December 1954, p. 1222.